(12) United States Patent
Cole

(10) Patent No.: US 6,595,070 B1
(45) Date of Patent: Jul. 22, 2003

(54) ACOUSTIC FLOW METERS

(75) Inventor: Trevor Cole, New South Wales (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/926,570

(22) PCT Filed: May 29, 2000

(86) PCT No.: PCT/AU00/00612

§ 371 (c)(1),
(2), (4) Date: Jan. 11, 2002

(87) PCT Pub. No.: WO00/73804

PCT Pub. Date: Dec. 7, 2000

(30) Foreign Application Priority Data

May 27, 1999 (AU) .............................................. PQ0613

(51) Int. Cl.[7] ................................................. G01F 1/66
(52) U.S. Cl. ................................................. 73/861.27
(58) Field of Search ........................ 73/861.27, 861.28, 73/861, 23, 861.18, 861.25, 861.26, 861.31

(56) References Cited

U.S. PATENT DOCUMENTS

| | | | | |
|---|---|---|---|---|
| 4,532,812 A | * | 8/1985 | Birchak ..................... | 73/152.21 |
| 5,421,212 A | * | 6/1995 | Mayranen et al. ....... | 73/861.28 |
| 5,493,916 A | * | 2/1996 | Bignell ..................... | 73/861.27 |
| 5,533,408 A | * | 7/1996 | Oldenziel et al. ........ | 73/861.06 |
| 5,553,505 A | | 9/1996 | Bignell et al. | |
| 6,305,233 B1 | * | 10/2001 | Braathen et al. ......... | 73/861.27 |

FOREIGN PATENT DOCUMENTS

| | | |
|---|---|---|
| EP | 0 797 105 A2 | 9/1997 |
| JP | 11-051726 A | 2/1999 |

* cited by examiner

Primary Examiner—Edward Lefkowitz
Assistant Examiner—Jewel Thompson
(74) Attorney, Agent, or Firm—Carol M. LaSalle; Bozicevic, Field & Francis LLP

(57) ABSTRACT

Acoustic flow meters are used for the measurement of flow velocity of fluids. They have particular application in meters for gas and water in pipelines. The meter includes a tube fitted with three or more acoustic transducers distributed along its length and arranged to transmit wave packets up and down between at least two pairs of the acoustic transducers. The wave packets comprise a signal including zero crossings spaced apart by a packet period determined by a known packet frequency. The flow meter also includes measurement means associated with the transducers to make first measurements of received packets, from which the time of arrival of the zero crossings of a received packet can be determined relative to the time of transmission of the packet. A second measurement from which a particular zero crossing in the transmitted packet can be identified in the received packet. And calculation means to determine the velocity of fluid flow in the tube using the measurements. There is also a method of operation.

12 Claims, 3 Drawing Sheets

ACOUSTIC FLOW METERS

TECHNICAL FIELD

This invention concerns acoustic flow meters. These meters are used for the measurement of flow velocity of fluids. They have particular application in meters for gas and water in pipelines. The invention also concerns a method of operating such flow meters.

BACKGROUND ART

A flow meter system consists of two acoustic transducers separated by a known distance within a tube through which the fluid flows. The measurement is of the time of flight of an acoustic wave packet between the two transducers in the direction of flow of the fluid and a second measurement of the time of flight in a direction opposite to the flow of the fluid. These will differ because the effective propagation velocity of the acoustic energy is the vector sum of the fluid velocity and the velocity of the acoustic energy in the fluid when it is at rest. The two unknowns of average acoustic velocity and average fluid flow velocity can be derived from these two measurements. In many practical situations sufficient accuracy is obtained by assuming that the fluid flow rate is directly proportional to the simple difference between the upstream and downstream times of flight.

Many variations exist in the physical arrangements of the two transducers and tube, and in the processing of the acoustic signals. Many of these variations are techniques to overcome problems which derive from multiple acoustic modes propagating in the tube, from multiple reflections within the tube, and from variations in flow velocity within the cross sectional area of the tube.

The core measurement in an acoustic flow meter is of the delay between transmission of the wave packet from one transducer and its reception at a second after propagation through the section of flow tube. The desired data are obtained from the time of arrival of a wave packet which consists of a number of cycles of oscillation whose amplitude commences at zero, rises to a maximum and then decays again to zero.

In the case of existing acoustic flow meters with multiple acoustic propagation modes and multiple reflections, only the first few cycles of the received wave packet are free from these effects and must be relied upon for the measurement of arrival time. In practice this leads to reliance on identifying just one zero crossing of the signal in the early part of the wave packet to estimate the instant of time of commencement of the received packet. To achieve this it is necessary to use high power driving circuits in the transmitters to create a rapid rise or onset in the received acoustic wave packet, and expensive and less sensitive wide band transducers in the receivers.

SUMMARY OF THE INVENTION

The invention, as currently envisaged, is an acoustic flow meter, including a tube fitted with three or more acoustic transducers distributed along the length of the tube and arranged to transmit wave packets up and down the tube between at least two pairs of the acoustic transducers, the wave packets comprising a signal including zero crossings spaced apart by a packet period determined by a known packet frequency; the flow meter also including measurement means associated with the transducers to make first measurements of received packets, from which the time of arrival of the zero crossings of a received packet can be determined relative to the time of transmission of the packet, and a second measurement from which a particular zero crossing in the transmitted packet can be identified in the received packet: and calculation means to determine the velocity of fluid flow in the tube using the measurements.

Measuring phase introduces ambiguity. The measured phase repeats at integer intervals of the period of the oscillation in the received waveform. The invention helps to resolve this ambiguity in the phase measurement and determine which zero crossing or cycle within the waveform is to be the reference time of arrival of the received wave packet.

By using narrow diameter tubes, lower frequencies, longer tubes, and careful design, it is possible to receive wave packets in which a significant number of cycles are free from any multiple reflection effects and are therefore available for analysis. Where only a single (zeroth) acoustic mode propagates it is possible to avoid contamination of the received wave packet by slower higher mode components. Under particular circumstances in the presence of higher order modes, the long tube can still provide cycles free from contamination by the slower higher order modes propagating in the tube.

A longer tube gives the freedom to design a tube in which effects of multiple reflections and higher order modes are minimised. As a result, a greatly increased number of cycles in the received packet become available for processing and much less reliance need be placed on the first one or two cycles and accurate control of amplitude. A consequence of these improvements is that cheaper yet more efficient, narrow band transducers can be utilised.

Distinct advantages arise using relatively small diameter tubing, relatively low acoustic frequency, and a relatively large distance between the two transducers. The small diameter increases the velocity for a given mass flow rate and this, along with the longer tube, increases the sensitivity of the instrument. There is also a minimisation of flow velocity variation across the cross-section of the tube. The increased pressure drop introduced by such a tube may or may not be important in specific applications.

An advantage of the invention is to enable accurate measurement of arrival time of wave packets reliant only on one, or more, zero crossings within the received waveform and not reliant on a rapid rise and known amplitude and shape of envelope.

Where there are a multiple of zero crossings which can be used as part of the phase measurement, this significantly increases the accuracy compared with use of just a single zero crossing.

The first measurements may be of the average phase of a series of zero crossings with reference to a clock signal of known periodicity.

The period of the clock of known periodicity may be the packet period.

The second measurement may be of zero crossings in packets having different packet frequencies.

The second measurement may be of phase difference between wave packets transmitted between two or more pairs of transmitting and receiving acoustic transducers.

The calculation means may rely upon the known distances, or ratio of distances, between the pairs of transmitting and receiving transducers.

The use of low acoustic frequencies and narrowband transducers has the added benefit of tending to reduce the power consumption within the electronics, which is an important consideration in battery driven meters designed for long field life.

The invention may therefore offer advantages of a reduction in signal processing power consumption, the ability to use cheap, narrow band and non-critical transducers, and the avoidance of need for accurate control of received wave packet amplitude and shape.

In a second aspect the invention is a method of operating an acoustic flow meter including a tube fitted with three or more acoustic transducers distributed along the length of the tube and arranged to transmit wave packets up and down the tube between at least two pairs of the acoustic transducers, the wave packets comprising a signal including zero crossings spaced apart by a packet period determined by a known packet frequency: the method comprising the steps of:

- making first measurements of packets received at a transducer, from which the time of arrival of zero crossings of a received packet can be determined relative to the time of transmission of the packet;
- making a second measurement from which a particular zero crossing in the transmitted packet can be identified in the received packet; and
- calculating the velocity of fluid flow in the pipe using the measurements.

BRIEF DESCRIPTION OF THE DRAWINGS

Examples of the invention will now be described with reference to the accompanying drawings, in which.

BEST MODES OF THE INVENTION

Analysis of Zero Crossings for Packets With Different Centre Frequencies

Figure 1:
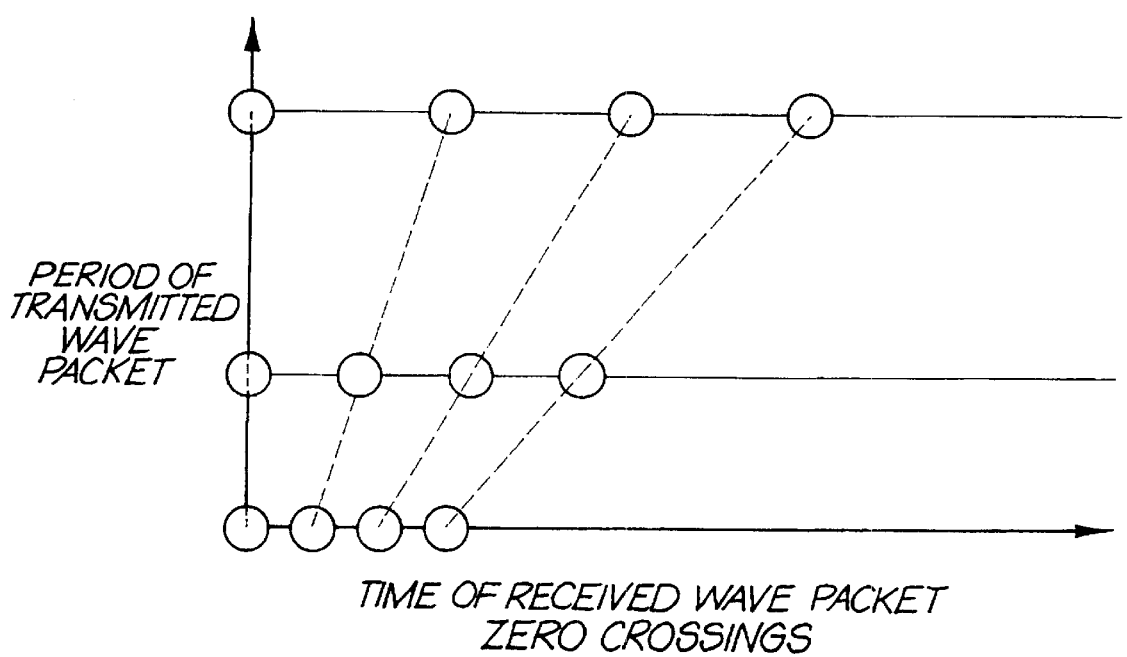
FIG. 1 is a plot of times of zero crossings within received packets having different centre frequencies.

Consider successive wave packets transmitted from a first to a second transducer, where each packet has a centre frequency different from the previous packet (and therefore a different period). A plot of the times of zero crossings within the received wave packets horizontally, but placed vertically on the plot at a position in direct proportion to the period of the acoustic energy for that wave packet, will result in the plots shown in FIG. 1.

Assuming that the transmitted wave packets all started with a zero crossing, then it is only the very beginning zero crossings which will line up vertically for all received wave packets regardless of centre frequency. For zero crossings later than the packet start, there will be a progressive spreading out due to the progressively longer period of those wave packets at lower centre frequencies. By a process of trial and error, it would be possible to find the true beginning of the wave packet as that unique zero crossing for which the following progressive zero crossings align as per the dotted lines in the figure.

This technique obviously requires the transducers to have a finite bandwidth and so is not ideally matched to the case of narrow band transducers.

Use of a Third or More Transducer—Ratio of Distance Between Receivers

Figure 2:
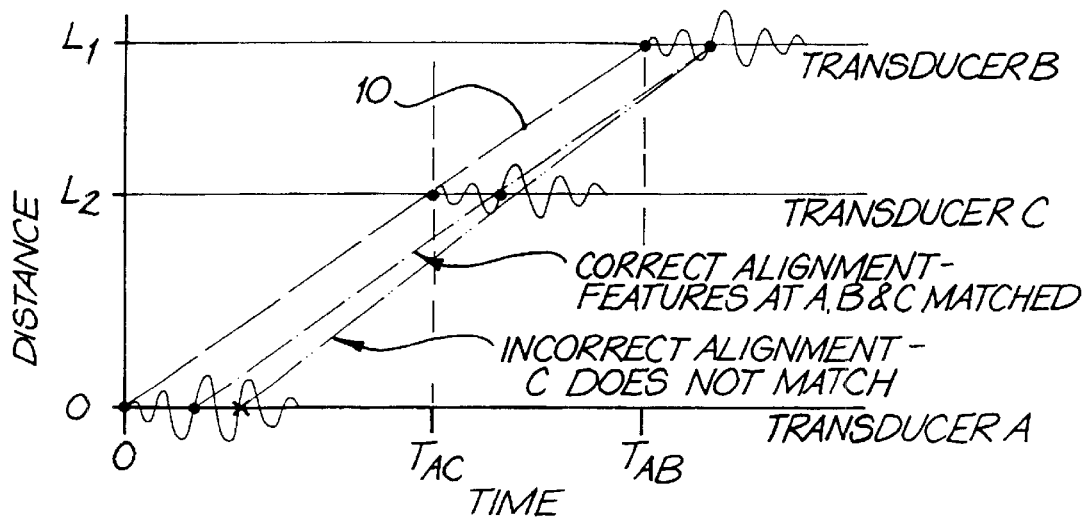
FIG. 2 is a plot illustrating the relationship between corresponding identical zero crossings within waveforms transmitted from one and received at the others of three transducers.

The preferred embodiment of the invention is one in which a third transducer is placed intermediary between the main two transducers at a position known to high accuracy through calibration. For example, consider a third transducer C placed between transmitter A and receiver B. FIG. 2 is a plot of distance as a function of time, and the figure illustrates how a wave packet transmitted from transducer A at time zero reaches transducer C distant $L_2$ at time $T_{AC}$ and then transducer B at distance $L_1$ at time $T_{AB}$.

The instants of FIRST transmission at A and of FIRST arrival of the wave packets at C and B must line up along the unique line drawn on the figure. This line is such that the ratio of the two measured times $T_{AB}$ and $T_{AC}$ must equal the fixed geometrical ratio of $L_1$ to $L_2$. Even if the speed of transmission changes, the ratio remains the same.

If the same point within the transmitted and received wave packets is chosen as the reference times, then these are also related by the fixed ratio. In this case, however, there is an offset time of this reference point from the beginning of the wave packet. For points within the wave packet other than the specific ones on the unique line 10, their offset time does not scale with the fixed ratio. And so it is possible to determine which of the features within the received wave packet are the reference ones by seeing whether they obey the ratio requirements.

In actual observations, measurements are made of the transit delay to a zero crossing within the waveform at the two receiving transducers. But due to the phase repeating every 360 degrees, there will be ambiguity about whether the zero crossings used in the measurement are those actually used at calibration time. The ambiguity is resolved by considering in turn each possible zero crossing at transducer B. The transmission delay to that zero crossing is decreased by the offset from wave packet start determined at an original calibration stage then scaled down by the known ratio $L_2/L_1$. The correct crossing at B is that one, which when scaled down and increased by that same offset determined at calibration, corresponds exactly with a measured delay to a zero crossing time at transducer C. For other zero crossings at B, their offset from the correct zero crossing will mean that the scaled down times do not align with a measured zero crossing time at transducer C. This is because, as obvious from FIG. 2, they are on a line of different slope than the one chosen at the time of calibration.

As an example, consider the case where the ratio R=0.6 and the successive, positive going zero crossings in the wave packet are separated by 25 microseconds (That is, the frequency of the wave packet is 40 kHz). If the time for packet transmission from A to B were 3000 microseconds, then the time from A to C would be 1800 microseconds. Transmission times to zero crossings at C and B either side of the reference zero crossing transmitted from A would then be as listed in the left and right columns of the table:

Transmission times to successive zero crossings (microseconds):

| Zero crossings at C (microseconds) | Zero crossings at B scaled by 0.6 | Zero crossings at B (microseconds) |
|---|---|---|
| 1675 | 1725 | 2875 |
| 1700 | 1740 | 2900 |
| 1725 | 1755 | 2925 |
| 1750 | 1770 | 2950 |
| 1775 | 1785 | 2975 |
| Reference zero crossing—1800 | 1800 | 3000 |
| 1825 | 1815 | 3025 |
| 1850 | 1830 | 3050 |
| 1875 | 1845 | 3075 |
| 1900 | 1860 | 3100 |
| 1925 | 1875 | 3125 |

The centre column of the table lists the scaled down values of measured times of zero crossing at transducer B. It is seen that the scaled zero crossing corresponding to the reference zero arrival at B matches with the reference arrival time at C (1800 microseconds). The four following zero crossings arriving at B do not have, after scaling, a corresponding matching arrival time at C and are therefore rejected.

But note that the fifth crossing after the reference arrival at transducer B does have a match. That is, there is a limit to the degree of ambiguity which can be resolved. So long as one has other information to indicate the true arrival time within 5 zero crossings (ie 125 microseconds in this example), then this system will permit an unambiguous choice to be made of the correct zero crossing. Also note that it is necessary to measure the zero crossings themselves to within one fifth of a cycle if one is to use the table as above to determine which is the zero crossing to take as the true arrival time.

A different physical position of transducer C would provide a different degree of ambiguity resolution. For example, if placed so the length ratio is 0.55, the ambiguity distance would increase to 10 cycles. Placing the arrival time of the packet to within the ambiguity distance is a comparatively easy task which can be done using even approximate measurements of wave packet amplitude.

Alternative Three-Transducer Implementation—Ambiguity Resolution

Figure 3:
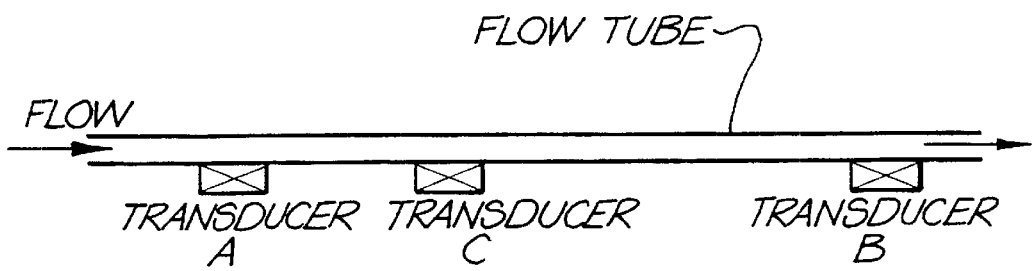
FIG. 3 is a schematic diagram illustrating one example of the invention where a third transducer couples at an intermediate point into the main tube between two other transducers.

An alternative approach to using a third (or more) transducer is to view the resulting arrangement as forming two independent flow tube systems. For example, consider a flow tube consisting of transducers A and B but with the additional transducer C placed in the flow tube section much closer to transducer A than to B, as shown in FIG. 3.

The more widely spaced system AB forms a sensitive acoustic flow meter but measurement of wave packet transit times using a phase approach will result in ambiguity in the measured transit time between A and B. This ambiguity is some unknown integral number of periods of the packet waveform. The ambiguity is compounded by the usual case that, over the range of flow rates from zero to maximum flow, the wave packet is shifted in arrival time, relative to that at zero flow, by a number of complete acoustic wave periods. The problem is to determine by exactly how many it has been shifted and which of the possible wave periods is the correct one.

The system AC also forms an acoustic flow meter but, because it is of shorter flow tube length than AB, it has reduced sensitivity relative to the flow meter made from transducers A and B.

If the position of C is chosen appropriately close to A, then even at maximum flow rate, the induced shift in arrival time of the wave packet relative to zero flow conditions can be less than a complete cycle of the waveform. Hence, there is no ambiguity associated with measuring flow using the shorter system AC because one can predict that the difference in arrival times between the to- and fro-directions has to be less than one complete wave period.

In practice, even if the correct time difference exceeds one period at high flow rates, the correct time difference for AC can be resolved through the approximate flow rate measured by the ambiguous time difference over AB.

No matter if the actual measured time difference contains phase ambiguity offsets, for AC one simply adds or subtracts an appropriate number of wave packet periods to give a resulting time difference which is between zero and one wave period.

The measurement made with AC can then be used to resolve the ambiguity in measurement AB. One can predict the correct time difference for AB as equal to the measured difference for AC multiplied by the ratio of effective flow tube lengths AB:AC. This ratio is a characteristic of the instrument determined at time of manufacture. The measurement using AC need be only accurate enough to determine which of the possible phase positions in AB is the correct one.

Figure 4:
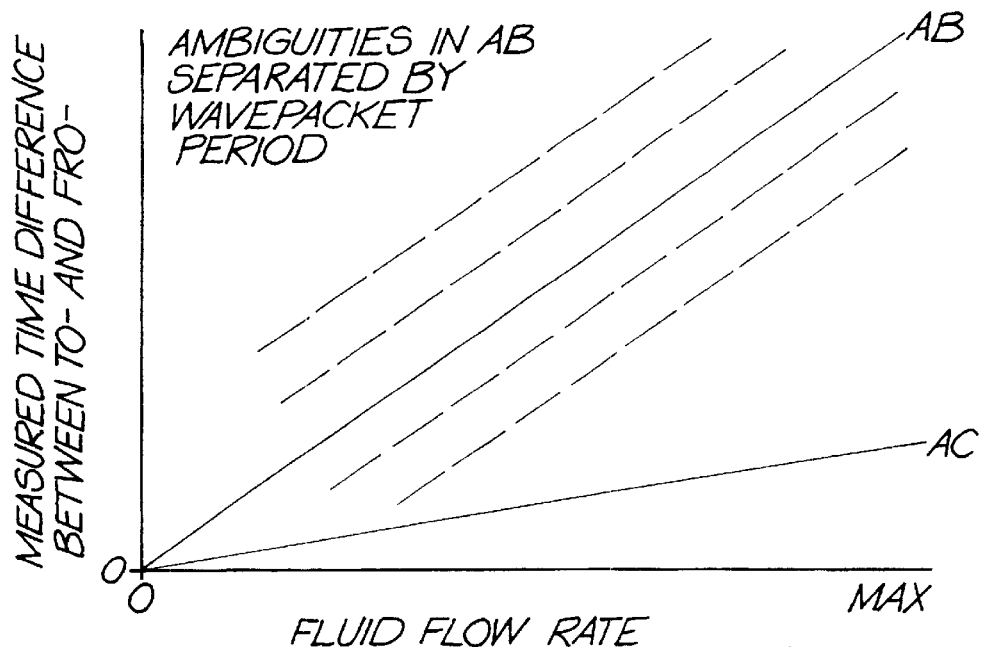
FIG. 4 is a plot of the measured time difference between to- and fro-directions as a function of fluid flow rate illustrating an unambiguous knowledge of that for AC but ambiguous values for that of the higher sensitivity AB needing, at any specific measurement, to be resolved.

The approach is illustrated in FIG. 4 which is a graph showing the lower sensitivity of AC compared with AB and also (as dashed lines) the possible ambiguities in measurement in time difference across AB.

Calibration of Tube Lengths

The ratio of lengths between the transducers A, B and C is a fixed parameter of the particular flow tube and is determined at manufacture. Two means to achieve this will be described.

In the first implementation, the input to an amplifier is connected to one transducer and the amplifier output is connected to the transducer at the other end of the tube whose length is being determined. With sufficient gain in the amplifier, the system will oscillate at a frequency determined very accurately by the tube length, the acoustic velocity, and any phase shift within the transducers and amplifier. There will be a number of possible modes of oscillation dependent on how many integral cycles of phase rotation occur in the signal in a complete loop around the system. The relevant formula is that for the length L, acoustic velocity v, frequency of resonance f and phase shift within the transducers and amplifier of A, (L*f/v)*360+A=n*360 degrees for an integer n.

Knowing the physical length to some degree of accuracy (and the phase shift of transducers and amplifier) one can distinguish between the various modes and hence permit a very accurate determination of length to be made.

An alternative approach is to apply a series of signals of very accurately known frequency into one transducer and to compare the phase between this signal and that received at the other end of the tube length being determined. As the applied frequency is changed, the phase difference will change at a rate directly proportional to tube length and from a knowledge of acoustic velocity and phase behaviour of transducers and amplifier, the effective physical tube length can be determined to high accuracy.

Of course, the derived lengths must also satisfy a closure requirement. For example, if transducer C is actually on the direct path between A and B, then the sum of length A to C plus the length C to B should equal the derived length of A to B (or at least to within an explainable difference). This enhances greatly the capacity to gain both consistency and accuracy in the calibration process.

In many situations it is merely the ratio of lengths which is required in which case the acoustic velocity need not be known to high accuracy so long as it is constant between measurements of the two tube lengths whose ratio is required.

Measurement of Absolute Times of Flight

In a practical situation, the acoustic velocity within the fluid will not be known and hence the scaling factor between time difference and flow rate will be unknown. In this case, measurement of acoustic velocity must be performed. One technique to do this is to measure the times of flight in the same and in the opposite direction of flow of the fluid in the tube. These measurements can then be solved for the acoustic velocity. They can also form an alternative means to determine the fluid velocity by the well known formulae for acoustic flow meters.

Figure 5:
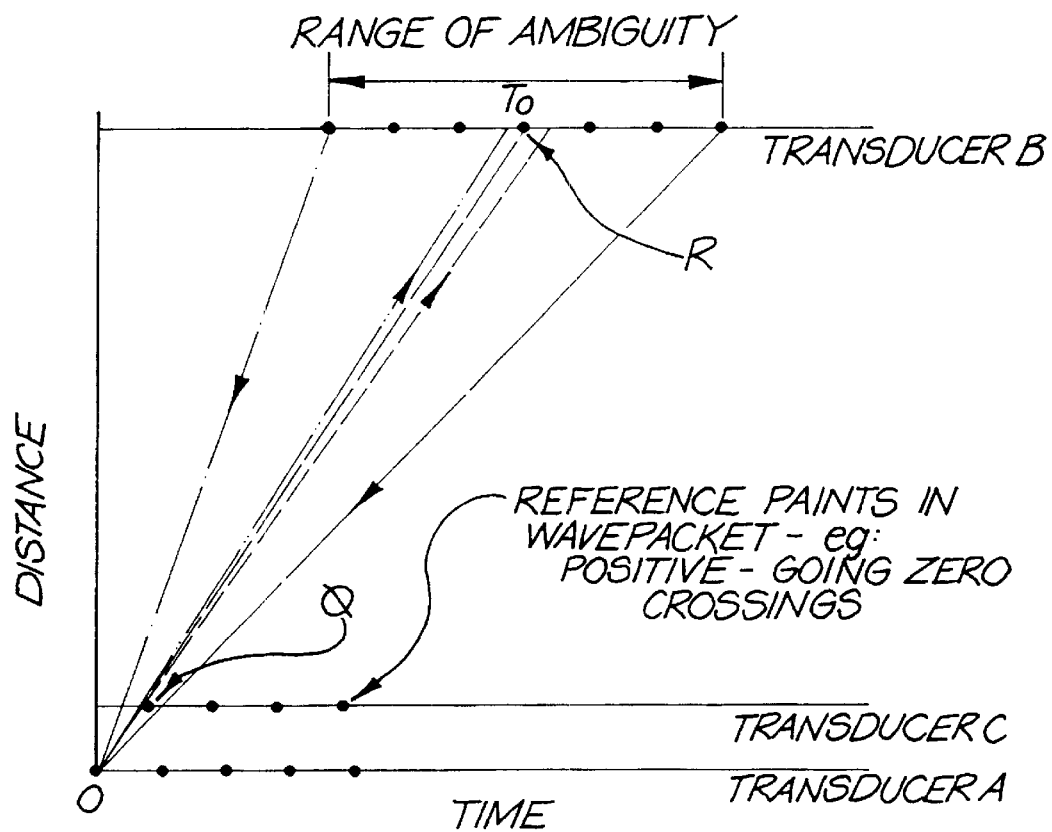
FIG. 5 is a plot of delay from the instant that a particular reference waveform feature is applied to transducer A against distance along the tube from transducer past C to B and illustrating the relationship between that particular feature at the three transducers and nearby ambiguities at C and B needing to be resolved.

Since phase is measured, a means is required to overcome the inherent ambiguity. This is illustrated by FIG. 5 in which distance is plotted vertically and time horizontally. With transducer A at the origin O, the distances to the two transducers C and B are known accurately. When a particular feature within the wave packet is transmitted from transducer A at time zero, it will arrive at each transducer C and B after the appropriate delay and there will be a number of accurately determined possible positions for this feature separated by the known ambiguity equal to the waveform period.

Arrival time of the packet envelope itself will permit approximate determination of arrival time at transducer B of the particular feature. But because of the narrow band transducer and relatively slow increase in packet amplitude, this estimate has an uncertainty shown as $T_0$ on the figure.

Extrapolation of the boundaries of this uncertainty back to the figure origin O defines a box within which the particular wave packet feature must always lie. At the transducer C much closer to the transmitting transducer A, the uncertainty box is much narrower and will contain only one possibility for the wave packet feature marked on the figure as Q.

Techniques mentioned elsewhere in this document permit determination of the arrival time of a feature Q to high accuracy. A suitable feature would be a particular positive-going zero crossing within the waveform. Extrapolation of a line from origin O through this point Q out to transducer B will now define a much narrower uncertainty box which, at B, contains a single possible wave packet feature shown as R. It can be assumed that Q and R refer to the same feature and hence the slope of the now accurately known line joining them corresponds to the velocity of the wave packet in the tube. This is equal to the vector combination of acoustic velocity and fluid velocity. Measurement of wave packet arrival time in the opposite direction using an identical technique then permits solution for both the acoustic velocity and the fluid velocity.

In practice, knowledge of the wave packet transit time in one direction plus knowledge of the difference between the to- and fro-directions (as determined by techniques described elsewhere) is sufficient to solve for acoustic and fluid velocity.

An Implementation of the Invention

In exploiting the invention, measurement of transit time takes the form of phase comparison between, on the one hand, zero crossings within the received wave packet and, on the other, transitions in an accurate clock of almost the same period. The first step is to establish the number of integral clock cycles of known period between the time of transmission of the wave packet and the time of arrival of some point within the early part of the received wave packet. The second step is to determine the accurate value of displacement of the received wave packet relative to this point in time.

In more detail, after transmission of the packet from one transducer, the receiver on the other transducer monitors for acoustic energy whilst a counter is accumulating the number of clock cycles since transmission. A threshold level in the receiver triggers when the received wave packet energy is sufficiently above the noise, initiating an interrupt at the next transition of the clock, and a registering of that value of the count of clock cycles as a digital word. We denote this count as $N_{AB}$ for the particular transducer pair with A transmitting to B.

The interrupt also initiates the immediate creation of a window which opens and which is open for a determined number of clock cycles (typically about 8 cycles of the wave packet). This accurate window is used to slice out a section of the received wave packet which is then amplified, limited and converted to a clean "digital" signal of accurately defined amplitude.

The information to be sought is in the zero crossings of the received waveform which have now been transferred to the transitions within this windowed "digital" sample.

The average phase of these zero crossings is then determined by phase comparison against the clock signal. Comparison could be through high speed digital counting circuitry or lower power consuming analogue circuitry.

A phase comparator compares the successive zero crossings between signal and its reference and produces an analogue output proportional to the difference in their relative arrival times. Phase comparison is an established technique which typically produces two comparison values ("Sine" and "Cosine") obtained by comparing the "digital" sample against the in phase clock signal and a version of the clock signal which is shifted by a quarter cycle or 90 degrees. These differences are accumulated in an integrator over the duration of the window and, at the end of the window, the integrated charge is sampled and converted to a digital word by an analogue-to-digital converter.

Because the phase comparator uses a multiple of zero crossings (16 for a window of 8 periods), it is inherently more accurate than any system relying on just a single zero crossing.

The output format of the arrival time measurement is therefore a count of the number of clock cycles from transmission to threshold registration plus a pair of digital words representing the relative phase. The relative phase still needs to be converted to the fractional displacement of the wave packet waveform relative to the clock at the time of the window.

On the longer length AB, one notes that the count of number of clock cycles is, in itself, a crude estimate of the transmission time and can be used to ensure internal consistency of the measurements.

In order to do a full flow measurement, four wave packet transit times need to be determined and each will be represented in the form of three digital words. These four transducer pairs (transmitter-receiver) are: AB, BA, AC, and CA.

Since phase comparison of signals is a standard technique, many variations on the described approach exist to achieve the same result.

At this point one has reduced the data to two digital words per transducer pair representing the clock count to the wave packet arrival plus a phase value. This phase value represents the average phase of the received waveform at the centre point of the clock-defined window. We could represent these relative phases as $P_{AB}$, $P_{BA}$, $P_{AC}$ and $P_{CA}$.

In order to find the time of arrival of a particular positive-going zero crossing within the received wave packet, one needs to know the period of the wave packet signal. This is equal to the time interval between successive positive-going zero crossings in the received wave packet, determined by the individual transducers used for that transmit-receive combination. Because the system is to use cheap transducers whose centre frequencies may vary, such values will therefore need to have been determined as part of the instrument calibration. Define these as: $T_{AB}$, $T_{BA}$, $T_{AC}$ and $T_{CA}$.

As an example for the AB transducer pair, the zero crossing is then at a time relative to the centre of the window equal to:

$Tzero_{AB} = -T_{AB} * P_{AB}/360$

It can be possible to measure phases to within one or several degrees of phase implying zero crossing times can be determined to within about 1 part in 200 of the period.

The next stage of processing is to determine the difference between the up stream and down stream transit times. This is done first for the short AC length and then the AB length.

One can simply take the difference between the up stream data and the downstream data but reduced modulo the clock period interval. That is, the result must lie between zero and one acoustic waveform period. Assuming AC is up stream.

$D_{AC} = [(N_{AC} - N_{CA})*(\text{clock period interval}) - Tzero_{AC} + Tzero_{CA}]_{[modulo\ acoustic\ wave\ period]}$ One notes that $N_{AC}$ times the clock period is to the beginning of the window rather than the centre but since only differences are calculated, there is no need to add the half window offset as it cancels.

This difference in time $D_{AC}$ is, by design, unambiguous given the reduced sensitivity of the shorter length of AC. Or, if by design ambiguity is possible, then it can be made unambiguous by the approximate flow rates determined by the ambiguous measurement of delay between transducers A and B.

It tells us that the expected value of difference in up and down stream times over the longer length AB (that is $D_{AB}$) should equal $D_{AC}$ multiplied by the ratio of effective lengths of AB to AC. This ratio is a fixed parameter for that instrument and is determined at manufacture.

One determines the value $D_{AB}$ as:

$D_{AB} = (N_{AB} - NB_A)*(\text{clock period interval}) - Tzero_{AB} + Tzero_{B_A}$ Because of the phase ambiguity, this value is likely to differ from the correct value by one or more periods of the received wave packet. But one knows the general value which it should be by scaling the measurement over AC. The correct and accurate value is obtained by adding or subtracting from $D_{AB}$ the appropriate number of acoustic wave periods to match that predicted roughly by AC.

Calibration at manufacture would also have determined the various wave packet periods as well as any offsets in the electronics. The relationship between time difference and actual flow rate requires knowledge of the acoustic velocity in the fluid and the effective length of the pipe.

This is obtained by a separate calibration process carried out as often as is necessary and which determines the true times of wave packet travel between A and B in one direction and (if desired) opposite direction of flow.

Actual flow is then the corrected $D_{AB}$ multiplied by the sensitivity factor for tube AB at its current operating conditions.

At high flow rates it could well be the case that the measurement using the less sensitive distance between A and C alone is still sufficiently accurate to satisfy the instrument specifications. Similarly, for intermediate flow rates a single measurement using the longer distance between A and B may well satisfy the accuracy requirements of the instrument.

But at low flow rates and high pressures, a single measurement using path between A and B may not be sufficient to give the required accuracy. That is, $D_{AB}$ may not be large enough on a single pass to be confident about the answer to the required percentage accuracy.

In this case, the well known "ring around" technique can be used to effectively multiply the length of tube AB by the number of times the wave packet is sent around again and again. The "digital" form of the windowed wave packet becomes the transmit packet to the transducer. The transducer will now commence its new acoustic packet with the phase of this packet rather than the zero phase of the digitally created packet used to start the process.

When a packet is circulated M times, the resulting time difference becomes $M*D_{AB}$ which, for an appropriate M, can be sufficiently large to be measured to the required accuracy.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An acoustic flow meter, comprising:

a tube fitted with three or more acoustic traducers, each of which is paired with the other two or more transducers, wherein the transducers are distributed along the length of the tube and arranged to transmit wave packets up and down the tube between at least two of the pairs of the acoustic transducers, the wave packets comprising a signal including zero crossings spaced apart by a packet period determined by a known packet frequency;

measurement means associated with the transducers to make first, phase, measurements of received packets, from which the time of arrival of the zero crossings of a received packet can be determined relative to the time of transmission of the packet, and a second measurement from which a particular zero crossing in the transmitted packet can be identified in the received packet; and calculation means to unambiguously determine the velocity of fluid flow in the tube using the measurements.

2. An acoustic flow meter according to claim 1, wherein the first, phase, measurements are of the average phase of a series of zero crossings with reference to a clock signal of known periodicity.

3. An acoustic flow meter according to claim 2, wherein the period of the clock of known periodicity is the packet period.

4. An acoustic flow meter according to claim 1, wherein the second measurement is of zero crossings in packets having different packet frequencies.

5. An acoustic flow meter according to claim 1, wherein the second measurement is of the phase difference between wave packets transmitted between two or more pairs of transmitting and receiving acoustic transducers.

6. An acoustic flow meter according to claim 1, wherein the calculation means relies upon the known distances, or ratio of distances, between the pairs of transmitting and receiving transducers.

7. A method of operating an acoustic flow meter including a tube fitted with three or more acoustic transducers, each of which is paired with the other two or more transducers, wherein the transducers are distributed along the length of the tube and arranged to transmit wave packets up and down the tube between at least two of the pairs of the acoustic transducers, the wave packets comprising a signal including zero crossings spaced apart by a packet period determined by a known packet frequency, the method comprising the steps of:

making first, phase, measurements of packets received at a transducer, from which the time of arrival of zero crossings of a received packet can be determined relative to the time of transmission of the packet;

making a second measurement from which a particular zero crossing in the transmitted packet can be identified in the received packet; and calculating the velocity of fluid flow in the pipe unambiguously using the measurements.

8. A method according to claim 7, wherein the first, phase, measurements are of the average phase of a series of zero crossings with reference to a clock signal of known periodicity.

9. A method according to claim 8, wherein the period of the clock signal of known periodicity is the packet period.

10. A method according to claim 7, wherein the second measurement is of zero crossings in packets having different packet frequencies.

11. A method according to claim 7, wherein the second measurement is of the phase difference between wave packets transmitted between two or more pairs of transmitting and receiving acoustic transducers.

12. A method according to claim 7, wherein the calculating step relies upon known distances, or ratio of distances, between the pairs of transmitting and receiving transducers.

* * * * *